(12) United States Patent
You

(10) Patent No.: US 10,527,082 B2
(45) Date of Patent: Jan. 7, 2020

(54) CONNECTION STRUCTURE FOR TAPERED MALE SCREW AND THREADED HOLE

(71) Applicant: Yihua You, Yuhuan (CN)

(72) Inventor: Yihua You, Yuhuan (CN)

( * ) Notice: Subject to any disclaimer, the term of this patent is extended or adjusted under 35 U.S.C. 154(b) by 111 days.

(21) Appl. No.: 15/987,910

(22) Filed: May 24, 2018

(65) Prior Publication Data

US 2018/0266472 A1    Sep. 20, 2018

Related U.S. Application Data

(63) Continuation of application No. PCT/CN2016/107052, filed on Nov. 24, 2016.

(30) Foreign Application Priority Data

Nov. 24, 2015   (CN) .......................... 2015 1 0821486

(51) Int. Cl.
*F16B 33/02*    (2006.01)
*F16B 35/04*    (2006.01)
*F16B 39/282*   (2006.01)

(52) U.S. Cl.
CPC ............ *F16B 33/02* (2013.01); *F16B 35/041* (2013.01); *F16B 39/282* (2013.01)

(58) Field of Classification Search
CPC .. F16B 25/0078; F16B 33/002; F16B 33/004; F16B 33/02; F16B 35/041; F16B 39/282; F16B 39/30
USPC .................. 411/411, 424, 426, 427, 436, 924
See application file for complete search history.

(56) References Cited

U.S. PATENT DOCUMENTS

| 1,090,976 | A | * | 3/1914 | Encinas | F16B 39/282 411/187 |
| 1,523,463 | A | * | 1/1925 | Thomson | F16B 35/041 411/419 |
| 1,876,565 | A | * | 9/1932 | Buckwalter | E21B 17/042 403/334 |
| 1,953,095 | A | * | 4/1934 | Baker | E21B 17/042 403/307 |

(Continued)

FOREIGN PATENT DOCUMENTS

| CN | 1031587 A | 3/1989 |
| CN | 203847533 U | 9/2014 |

(Continued)

OTHER PUBLICATIONS

International Search Report of PCT/CN2016/107052, dated Mar. 3, 2017.

*Primary Examiner* — Roberta S Delisle
(74) *Attorney, Agent, or Firm* — Erson IP (Nelson IP)

(57) ABSTRACT

A connection structure for tapered male screw and threaded hole comprises a male screw and a female screw, and the male screw comprises an external helical surface and an end helical surface. The shape of the external helical surface is the same shape as a helical external surface of a rotating body formed by taking a right angle side of a right trapezoid coincident with a central axis of a cylindrical body as an axis of rotation and rotating the rotating body circumferentially at a constant speed, and at the same time moving the right trapezoid at a constant speed along the central axis of the cylindrical body. The shape of the end helical surface is the same as the helical end surface at the end in the movement direction of the axial movement of the rotating body.

9 Claims, 4 Drawing Sheets

(56) References Cited

U.S. PATENT DOCUMENTS

| | | | | |
|---|---|---|---|---|
| 2,016,610 A | * | 10/1935 | Moeller | F16B 4/004 |
| | | | | 411/424 |
| 2,036,604 A | * | 4/1936 | Pickop | F16B 39/30 |
| | | | | 411/308 |
| 2,895,367 A | * | 7/1959 | Nagy | F16B 35/041 |
| | | | | 411/378 |
| 3,151,653 A | * | 10/1964 | Zahodfakin | F16B 37/0857 |
| | | | | 411/267 |
| 3,439,722 A | * | 4/1969 | Brandon | F16B 39/30 |
| | | | | 411/308 |
| 3,586,353 A | * | 6/1971 | Lorenz | E21B 17/042 |
| | | | | 285/334 |
| 3,887,990 A | * | 6/1975 | Wilson | B23P 11/02 |
| | | | | 29/450 |
| 4,664,573 A | * | 5/1987 | Isler | E21D 21/0006 |
| | | | | 411/432 |
| 4,712,955 A | * | 12/1987 | Reece | F16B 13/0883 |
| | | | | 411/17 |
| 5,413,388 A | | 5/1995 | Kolvereid | |
| 5,779,410 A | * | 7/1998 | Lautenschlager | A47B 95/00 |
| | | | | 411/33 |
| 5,964,766 A | * | 10/1999 | Shaw | A61C 8/0022 |
| | | | | 411/411 |

FOREIGN PATENT DOCUMENTS

| | | |
|---|---|---|
| CN | 105443542 A | 3/2016 |
| CN | 205349975 U | 6/2016 |
| WO | 8707928 A1 | 12/1987 |

\* cited by examiner

CONNECTION STRUCTURE FOR TAPERED MALE SCREW AND THREADED HOLE

CROSS-REFERENCE TO RELATED APPLICATIONS

This application is a continuation of International Patent Application No. PCT/CN2016/107052 with a filing date of Nov. 24, 2016, designating the United States, now pending, and further claims priority to Chinese Patent Application No. 201510821486.X with a filing date of Nov. 24, 2015. The content of the aforementioned applications, including any intervening amendments thereto, are incorporated herein by reference.

TECHNICAL FIELD

The present invention relates to the field of thread connection structure, and more particularly to a tapered external thread and screw hole connecting structure.

BACKGROUND OF THE PRESENT INVENTION

A screw thread is a ridge wrapped around a cylinder or cone in the form of a helix. A screw thread is one of the first standardized mechanical structure elements, which has been widely used in all kinds of fields. The screw thread can be divided into many species and types with the one defined on a cylinder being called a straight thread, the one defined on a cone being called a tapered thread, and the one defined on an end surface of a cylinder or a truncated cone being called a plane thread. The screw thread defined on an outer circular surface of a main body is called an external thread, the screw thread defined on an inner circular surface of a main body is called an internal thread, and the screw thread defined on an end surface of a main body is called an end thread. The screw thread with its rotation direction and helix orientation following the left hand grip rule is called a left-handed thread, and the screw thread with its rotation direction and helix orientation following the right hand grip rule is called a right-handed thread. The screw thread with a single helix on a cross section of a main body is called a single-start thread, the screw thread with double helixes is called a double-start thread, and the screw thread with multiple helixes is called a multi-start thread. The screw thread with a triangular cross section is called a triangular thread, the screw thread with a trapezoidal cross section is called a trapezoidal thread, the screw thread with a rectangular cross section is called a rectangular thread, and the screw thread with a zigzagging cross section is called a zigzagging thread. The screw thread used for fastening connection is called a fastening connection thread, the screw thread mainly used for transmission is called a transmission connection thread, and the screw thread used for conduit connection is called a conduit connection thread.

The screw thread of a fastener is the fastening connection thread, which is usually a cylinder thread with a triangle cross section, and is usually a right-handed thread while a left-handed thread is used for special use. The screw thread of a fastener is usually a single-start thread while a double-start or multi-start thread is used for celerity disassembly and assembly. The screw thread of a fastener comprises a screw thread pair, i.e. an internal thread and an external thread. The coupling nature of the screw thread pair is determining by the requirements of the connection system. The basic requirements of the fastener on the screw thread are loading-bearing and self-locking capability instead of transmission capability. The basic condition for self-locking thread is that an equivalent friction angle is no less than a lead angle. The value of an equivalent friction angle is related to a thread angle, the bigger the thread angle is, the bigger the equivalent friction angle is, and the more beneficial to self-locking that is the fundamental cause of the thread angle of fastener being 60° C. The wedge thread proposed in recent years, also called "Spiralock nut", is an improvement to both of the metric screw threads and English screw threads, aiming at improving the self-locking capability of the screw thread defined on a fastener. The metric screw threads include ISO metric threads (M screw threads), aerospace metric threads (MJ screw threads), small metric threads (S screw threads) and Russian screw threads (MR screw threads), etc. the English screw threads include unified screw threads (UN screw threads), aerospace inch threads (UNJ screw threads). Whitworth threads and so on. In the English screw threads, the thread angle is 60° C. except that of the Whitworth thread.

The key factor for unthreading problem of the threaded fastener is the structure of the screw thread. In this case, the American engineers re-designed the geometric shape of the screw thread after researching on the shape the screw and force loaded on the fastener. At the end of 1970s, the technology of screw thread called "Spiralock" was proposed. The structure of "Spiralock" thread is that a wedge surface with a 30° C. inclination is defined at the root of a negative thread (internal triangular thread, i.e. female thread). When the bolt is coupled with the nut, a teeth portion of the external thread of a standard bolt abuts against the wedge incline of the internal thread, and hence generating interference screw locking to increase locking force. The increase of the locking force is due to the change of the thread angle which hence makes the angle between the normal force between the internal and external threads and an axis of the bolt to be 60° C. instead of 30° C., i.e. the angle of a standard thread. Obviously, the normal force of "Spiralock" thread is significantly greater than fasten stress. Thus, the locking friction generated is greatly increased. The technical level and professional direction are always focused on thread angles in researching on and solving the unthreading problem of threaded fasteners. The wedge threads are no exception. Moreover, the wedge threads are only partial variation of triangle threads. There is no wedge thread pair in use, and the wedge thread can be only used as female which couples with an external triangle thread. The locking force of the wedge thread is determined by the thread angle, and the loading force and self-locking capability of the wedge thread is the same as those of conventional thread techniques. The bolt or nut in the prior art has the defect of being easy unthreaded. With frequent shock of the device, the gap between the connection elements is increased, and the bolt and nut are hence unthreaded, or even fell out. In this case, it is easy for connectors in mechanical connection to depart from each other, or even cause security incident.

Aiming at the defects in the prior art, there has been a long-term exploration, and kinds of solutions have been proposed. For example, Chinese patent No. 201410521899.1 discloses a lock nut with changed thread pattern which comprises a nut body with an internal thread, a spiraling-up conic surface is defined on crest of the internal thread. As a preferred embodiment, an angle between a generatrix of the conic surface and center axis of the external thread is 30° C. As a preferred embodiment, two ends of the nut body are an entrance and an exit of the bolt respectively. The entrance of the bolt extends outwardly to form a step, an inclination of a step surface of the step is S. an edge of the exit of the bolt is an inclined surface with an inclination of D. As an improvement of above preferred embodiment, the S is ranged from 20° C. to 30° C., and the D is 30° C.

Above solution an improvement to a certain extent in solving the problem of easy looseness of connection between fasteners in prior art. However, there are still the problems of low bonding strength, low self-locking capability and low loading capability in above solution.

SUMMARY OF PRESENT INVENTION

Aiming at above technical problems, an object of the disclosure is to provide a tapered external thread and screw hole connecting structure with professional design, simple structure, good connection performance, high self-locking capability.

In order to achieve above objects, technical solutions of the present disclosure are as follows:

A tapered external thread and screw hole connecting structure, comprises an external thread and an internal thread in a threaded connection with each other; the external thread is defined on a main body, and the internal thread is defined in a connection hole; the external thread comprises an outside helical surface and a helical end surface; a shape of the outside helical surface is the same as a shape of a lateral surface of a solid of revolution formed by using a right trapezoid as a generatrix, rotating uniformly around a cathetus of the right trapezoid which is coincident with a center axis of the main body, and synchronously, axially and uniformly moving the right trapezoid along the center axis of the main body; a shape of the helical end surface is the same as a shape of helical end surface with a same direction as an axial moving direction of the solid of revolution; each rotation of the tapered external thread is in a geometrical shape of a helical external cone; the outside helical surface is a helical external conical surface of the helical external cone; the helical end surface is a helical end surface of the helical external cone; a cone angle is formed between the outside helical surfaces; a crest of the internal thread is contacted with the outside helical surface until interference fitting. When the tapered external thread and screw hole connecting structure in the present disclosure is in use, the crest of the internal thread and the outside helical surface are matched with each other and are sized until interference fitting to achieve the technical performances such as the connection property, locking property, anti-loosening performance, loading capability, sealing performance and so on. Namely, the crest of the internal thread and the outside helical surface are sized under the guiding of the helix until interference contacting, so that the technical performances such as the connection property, locking property, anti-loosening performance, loading capability, sealing performance and so on are achieved. It should be noted that the matching between the internal and external cones is the matching between the outside and inside conical surfaces in fact. In other words, when the internal and external cones match with each other, the matching surfaces between them are conical surfaces. In order to realize self-locking, the internal and external cones must satisfy some requirements which are relative to the conical surface and conical degree (cone angle) of the cone and are irrelevant to the end surface of the cone. However, it does not mean that a cone with any conical degree can be self-locked. In order words, it does not mean a cone with any cone angle can be self-locked. When the internal and external cones match with each they, they can be self-locked only when the cone angle of the outside helical surfaces and is in a certain rang. Therefore, the technical performances such as the loading capability, self-locking capability, anti-loosening performance, sealing performance and so on are irrelevant to internal helix guiding angle and are relative to the cone angle of the outside helical surfaces. In other words, the technical performances such as the loading capability, self-locking capability, anti-loosening performance, sealing performance and so on are mainly determined by the cone angle of the outside helical surfaces, and are also relative to friction factors of the main body and the connection hole to some extent.

In tapered external thread and screw hole connecting structure, the crest of the internal thread and the outside helical surface are in interference fit with each other. Preferably, the crest of the internal thread and the outside helical surface are sized with interference fit to achieve the fastened state of the connecting structure in this disclosure.

In tapered external thread and screw hole connecting structure, one end of the main body is an insertion end to be inserted into the connection hole; a small end in each rotation of the helical end surface is orientated towards the insertion end of the main body.

In the tapered external thread and screw hole connecting structure, one end of the main body is an insertion end to be inserted into the connection hole; a big end in each rotation of the helical end surface is orientated towards the insertion end of the main body.

In the tapered external thread and screw hole connecting structure, both the outside helical surface and the helical end surface are continuous helical surfaces or non-continuous helical surfaces; and the internal thread is a continuous helical surface or a non-continuous helical surface. Preferably, the outside helical surface, the helical end surface and the internal thread are all continuous helical surfaces so as to improve firmness of the connecting structure.

In the tapered external thread and screw hole connecting structure, the internal thread is a triangular thread, trapezoidal thread, rectangular thread, or an arced thread. However, the internal thread is not limited to any one of above threads, and it may be other thread as long as it is capable of matching with the external thread.

In the tapered external thread and screw hole connecting structure, when the right trapezoid goes through one rotation, a distance that the right trapezoid axially moves is equal to or greater than a length of the cathetus of the right trapezoid. This structure ensures the outside helical surface is enough in length, and enough strength is ensured when the outside helical surface matches with the inside helical surface.

In the tapered external thread and screw hole connecting structure, a transitional guiding surface is arranged between the outside helical surface and the helical end surface on a same rotation. The transitional guiding surface, as a helical end surface of the external cone, is designed based on the helical end surface and is a variation of the helical end surface to facilitate the matching between the internal and external threads and to be used as a design and manufacture rule. The transitional guiding surface facilitates the manufacture of the outside helical surface and the helical end surface, protects the internal and external threads from interference when they matching with each other and makes the matching more effective. A helical external thread line is formed between two adjacent outside helical surfaces. A vertical distance between the highest point and the lowest point of the external thread line, i.e. a height of the internal helix guiding angle, is much less than a height of thread angle of the screw thread in prior art. Such comparison is based on the prerequisite that the pitch of the external thread in the present disclosure is the same as that of the internal thread in prior art. The practical meaning is that the semi-cone angle of the cone angle of the internal helical surface is less than thread bottom angle of the tooth-type thread. The height of the thread angle refers to thread height or thread depth of tooth-type thread, i.e. metric internal thread. An external helix guide angle is defined as an angle between an inclined surface formed by a highest point and a lowest point of the external thread line and an axis of the tapered thread. The screw thread is with a more compact structure, higher strength, higher loading capability and better mechanical sealing performance, and a physical space for manufacturing the tapered internal thread is larger.

In the tapered external thread and screw hole connecting structure, a head portion with a diameter greater than that of the main body is arranged at an end of the main body. The main body can be a bolt without the head portion with a diameter greater than that of the main body. The connection hole is a connection hole defined on workpiece, such as a nut. The main body and the head portion are connected and acted as a bolt. The main body without the head portion is acted as a threaded rod.

Compared with prior art, the tapered-thread connection pair in this disclosure have the following advantageous of professional design, simple structure, easy operation, high locking force, high loading capability, good anti-loosening property, good mechanical sealing property, good stability and high self-locking capability. The fastening and connection functions can be realized by sizing between the internal and external cones until they are coupling with interference fit. The tapered-thread connection pair is capable of avoiding unthreading.

Figure 1:
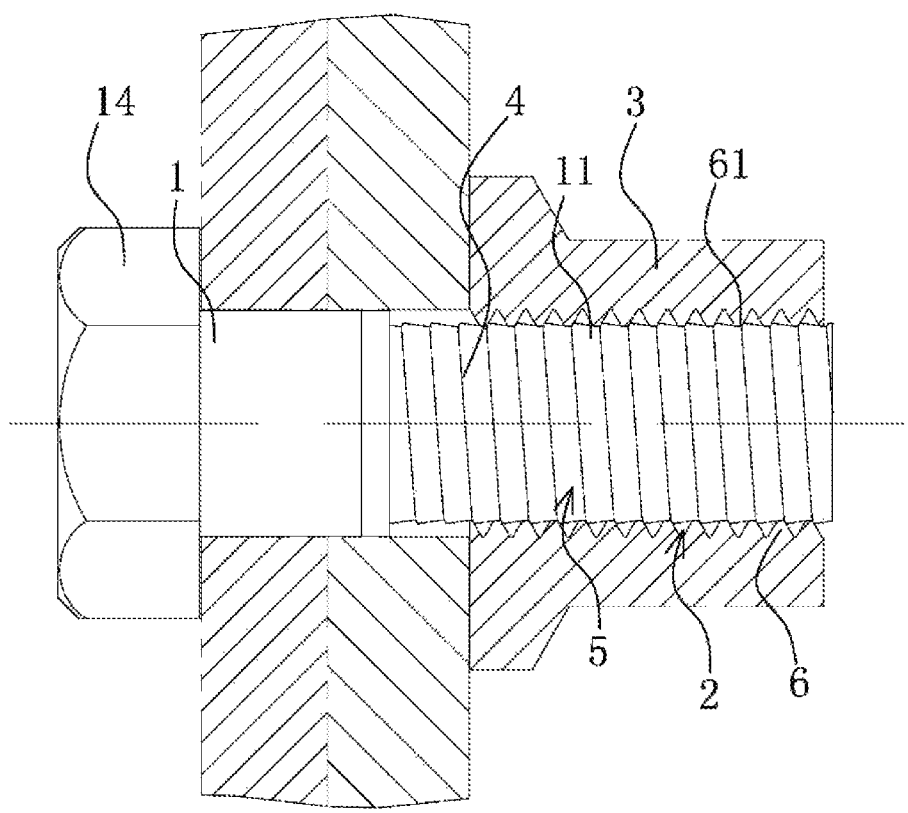
FIG. 1 is a schematic assembled view of a tapered-thread connection pair according to the present invention.

In the drawings, 1—main body; 2—connection hole; 11—outside helical surface; 12—helical end surface; 13—transitional guiding surface; 14—head portion; 3—nut; 4—external thread line; 5—external thread; 6—internal thread; 61—crest; α—cone angle; and β—internal helix guiding angle.

DETAILED DESCRIPTION OF PREFERRED EMBODIMENTS

The present invention is further described below in combination with drawings and embodiments.

Embodiment 1

Figure 2:
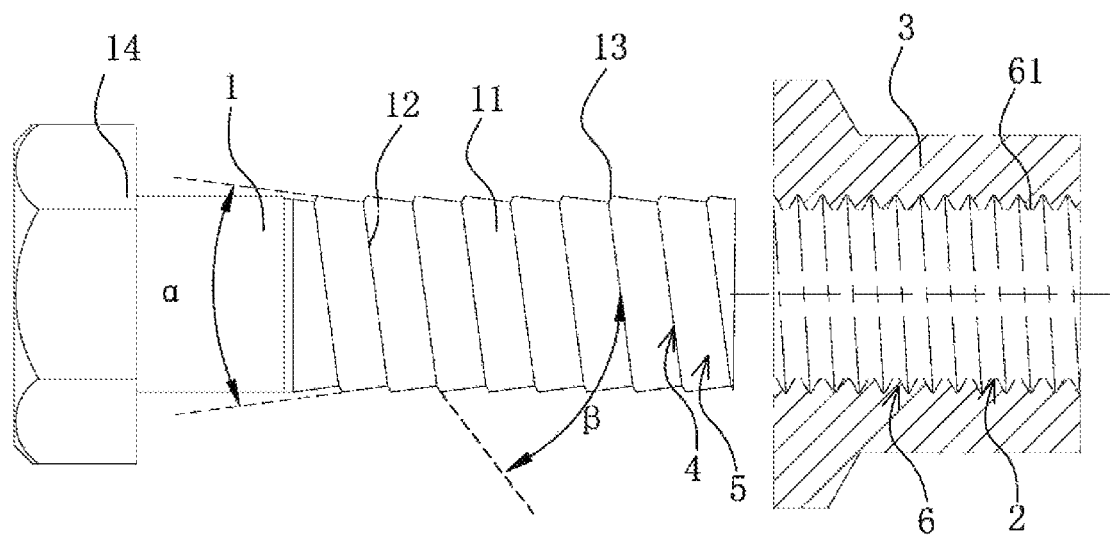
FIG. 2 is a schematic exploded view of the tapered-thread connection pair shown in FIG. 1.

As shown in FIG. 1 and FIG. 2, a tapered external thread and screw hole connecting structure, comprises an internal thread 6 and an internal thread 6 in a threaded connection with each other. The internal thread 6 is defined on a main body 1, and the internal thread 6 is defined in a connection hole 2. Preferably, a head portion 14 with a diameter greater than that of the main body 1 is arranged at one end of the main body 1. The connection hole 2 is a screw hole defined in a nut 3. Namely, the main body 1 and the head portion 11 are connected and acted as a bolt. The connection hole 2 is defined in the nut 3. The internal thread 6 comprises an outside helical surface 11 and a helical end surface 12. A shape of the outside helical surface 11 is the same as a shape of a lateral surface of a solid of revolution formed by using a right trapezoid as a generatrix, rotating uniformly around a cathetus of the right trapezoid which is coincident with a center axis of the main body 1, and synchronously, axially and uniformly moving the right trapezoid along the center axis of the main body 1. A shape of the helical end surface 12 is the same as a shape of helical end surface with a same direction as an axial moving direction of the solid of revolution. Each rotation of the tapered internal thread 6 is in a geometrical shape of a helical external cone. The outside helical surface 11 is a helical external conical surface of the helical external cone. The helical end surface 12 is a helical end surface of the helical external cone. A cone angle α is formed between the outside helical surfaces 11. A crest 61 of the internal thread 6 is contacted with the outside helical surface 11 until interference fitting. When the tapered external thread and screw hole connecting structure in the present disclosure is in use, the crest 61 of the internal thread 6 and the outside helical surface 111 are matched with each other and are sized until interference fitting to achieve the technical performances such as the connection property, locking property, anti-loosening performance, loading capability, sealing performance and so on. Namely, the crest 61 of the internal thread 6 and the outside helical surface 11 are sized under the guiding of the helix until interference contacting, so that the technical performances such as the connection property, locking property, anti-loosening performance, loading capability, sealing performance and so on are achieved. It should be noted that the matching between the internal and external cones is the matching between the outside and inside conical surfaces in fact. In other words, when the internal and external cones match with each other, the matching surfaces between them are conical surfaces. In order to realize self-locking, the internal and external cones must satisfy some requirements which are relative to the conical surface and conical degree (cone angle) of the cone and are irrelevant to the end surface of the cone. However, it does not mean that a cone with any conical degree can be self-locked. In order words, it does not mean a cone with any cone angle can be self-locked. When the internal and external cones match with each, they can be self-locked only when the cone angle α of the outside helical surfaces 11 is in a certain rang. Therefore, the technical performances such as the loading capability, self-locking capability, anti-loosening performance, sealing performance and so on are irrelevant to external helix guiding angle A and are relative to the cone angle α of the outside helical surfaces. In other words, the technical performances such as the loading capability, self-locking capability, anti-loosening performance, sealing performance and so on are mainly determined by the cone angle α of the outside helical surfaces 11, and are also relative to friction factors of the main body 1 and the connection hole 2 to some extent.

Specifically, in this embodiment, one end of the main body 1 is an insertion end to be inserted into the connection hole 2. A small end in each rotation of the helical end surface 12 is orientated towards the insertion end of the main body 1. The crest 61 of the internal thread 6 and the outside helical surface 11 are in interference fit with each other. Preferably, the crest 61 of the internal thread 6 and the outside helical surface 11 are sized with interference fit to achieve the fastened state of the connecting structure in this disclosure.

Both the outside helical surface 11 and the helical end surface 12 are continuous helical surfaces or non-continuous helical surfaces; and the internal thread 5 is a continuous helical surface or a non-continuous helical surface. Preferably, the outside helical surface 11, the helical end surface 12 and the internal thread 5 are all continuous helical surfaces so as to improve firmness of the connecting structure. The internal thread 6 may be a triangular thread, trapezoidal thread, rectangular thread, or an arced thread. However, the internal thread is not limited to any one of above threads, and it may be other thread as long as it is capable of matching with the internal thread.

Further, when the right trapezoid goes through one rotation, a distance that the right trapezoid axially moves is equal to or greater than a length of the cathetus of the right trapezoid. This structure ensures the outside helical surface 11 is enough in length, and enough strength is ensured when the outside helical surface 11 matches with the internal thread 6. A transitional guiding surface 13 is arranged between the outside helical surface 11 and the helical end surface 12 on a same rotation. The transitional guiding surface 13, as a helical end surface of the external cone, is designed based on the helical end surface 12 and is a variation of the helical end surface 12 to facilitate the matching between the internal and external threads and to be used as a design and manufacture rule. The transitional guiding surface 13 facilitates the manufacture of the outside helical surface 11 and the helical end surface 12, protects the internal and external threads 6 and 5 from interference when they matching with each other and makes the matching more effective. A helical external thread line 4 is formed between two adjacent outside helical surfaces 11. A vertical distance between the highest point and the lowest point of the external thread line, i.e. a height of the internal helix guiding angle $\beta$, is much less than a height of thread angle of the screw thread in prior art. Such comparison is based on the prerequisite that the pitch of the internal thread 6 in the present disclosure is the same as that of the external thread 5 in prior art. The practical meaning is that the semi-cone angle of the cone angle $\alpha$ of the internal helical surface 11 is less than thread bottom angle of the tooth-type thread. The height of the thread angle refers to thread height or thread depth of tooth-type thread, i.e. metric internal thread. An external helix guide angle $\beta$ is defined as an angle between an inclined surface formed by a highest point and a lowest point of the external thread line 4, i.e. the transitional guiding surface 13, and an axis of the tapered thread. The screw thread is with a more compact structure, higher strength, higher loading capability and better mechanical sealing performance, and a physical space for manufacturing the tapered internal thread is larger.

Embodiment 2

Figure 3:
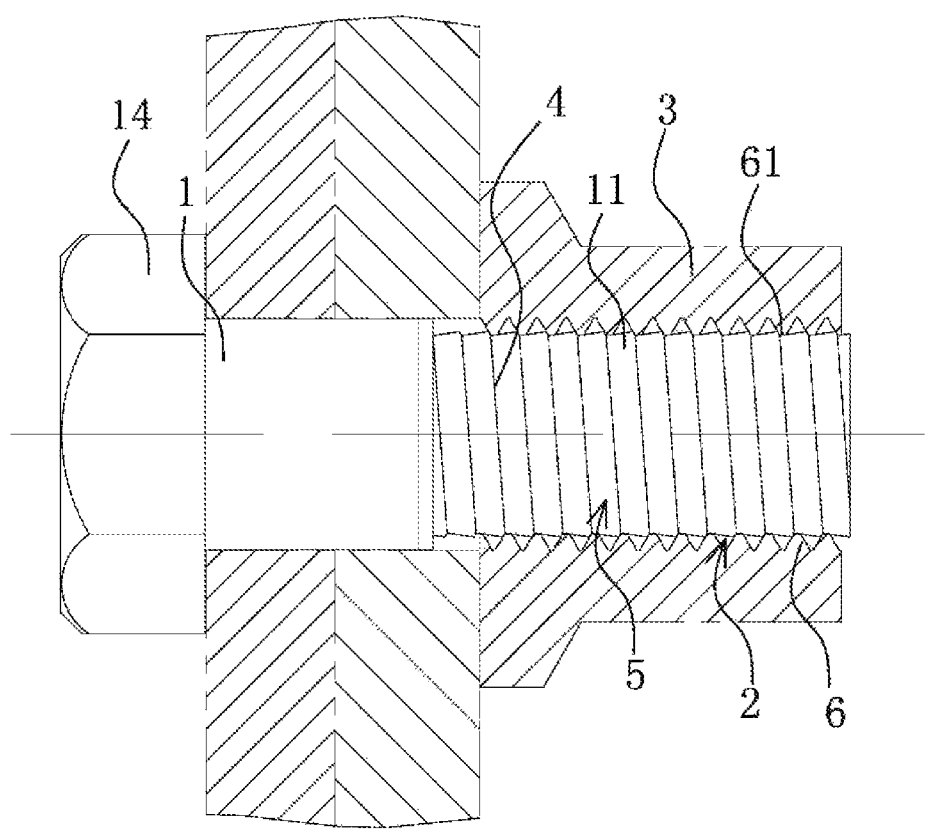
FIG. 3 is a schematic assembled view of a tapered-thread connection pair according to the present invention.
Figure 4:
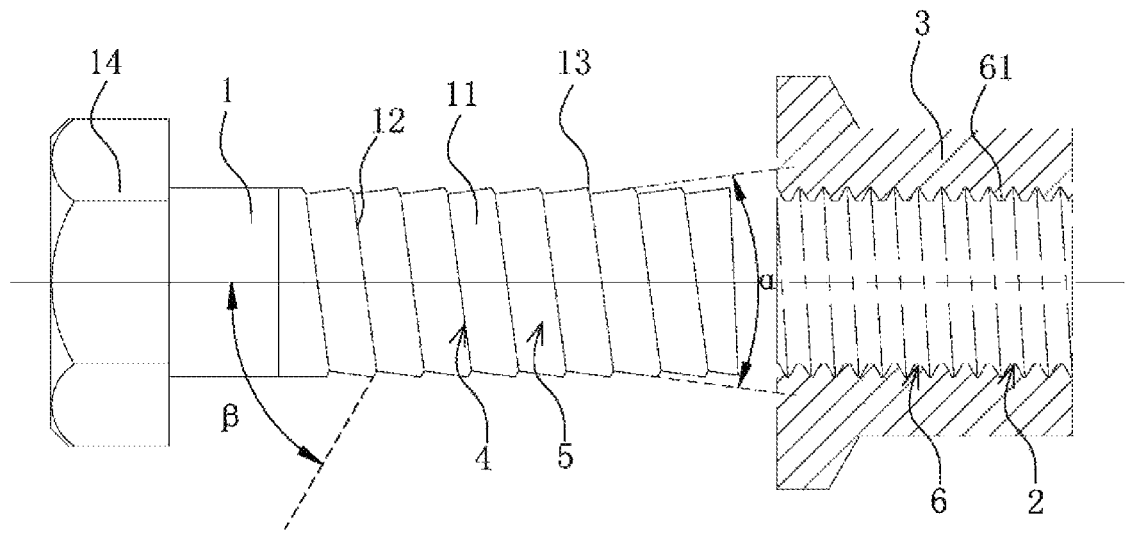
FIG. 4 is a schematic exploded view of the tapered-thread connection pair shown in FIG. 2.

As shown in FIG. 3 and FIG. 4, the structure, principle and implementing method of the tapered external thread and screw hole connecting structure in this embodiment are similar to those of the first embodiment. The differences are that one end of the main body 1 in this embodiment is an insertion end to be inserted into the connection hole 2, a big end in each rotation of the helical end surface 12 is orientated towards the insertion end of the main body 1.

The specific embodiments described in this disclosure are exemplary illustrations to the spirit of the present invention. It is obvious to one of ordinary skill in the art to make modifications and/or supplementary and/or obtain equivalence using a similar principle under the teaching of this disclosure without departing from the spirit of the present invention or being beyond the protection scope defined in the claims.

Understandably, the structure of the tapered external thread and screw hole connecting structure can be widely implemented on all kinds of products, such as bolt and nut with threaded structures, valves with threaded structure, transmission mechanisms, containers and so on, as long as the products have internal and external threads coupling with each other.

Although terms such as main body 1, connection hole 2, outside helical surface 11, helical end surface 12, transitional guiding surface 13, head portion 14, nut 3, external thread line 4, external thread 5, internal thread 6, crest 61, cone angle $\alpha$, and internal helix guiding angle $\beta$ and so on, have been widely used in the present disclosure, other terms can also be used alternatively. These terms are only used to better description and illustration the essence of the present invention. It departs from the spirit of the present invention to deem it as any limitation of the present invention.

I claim:

1. A tapered external thread and screw hole connecting structure, comprising an external thread and an internal thread in a threaded connection with each other; wherein the external thread is defined on a main body, and the internal thread is defined in a connection hole; the external thread comprises an outside helical surface and a helical end surface; a shape of the outside helical surface is the same as a shape of a lateral surface of a solid of revolution formed by using a right trapezoid as a generatrix, rotating uniformly around a cathetus of the right trapezoid which is coincident with a center axis of the main body, and synchronously, axially and uniformly moving the right trapezoid along the center axis of the main body; a shape of the helical end surface is the same as a shape of helical end surface with a same direction as an axial moving direction of the solid of revolution; a cone angle ($\alpha$) is formed between outside helical surfaces; the external thread is in a geometrical shape of a helical external cone; the outside helical surface is a helical external conical surface of the helical external cone; a helical external thread line is formed between two adjacent outside helical surfaces; an external helix guide angle ($\beta$) is defined as an angle between an inclined surface formed by a highest point and a lowest point of the external thread line and an axis of the external thread; a vertical distance between the highest and lowest points of the external thread line is defined as a height of the external helix guide angle; a crest of the internal thread is contacted with the outside helical surface until interference fitting; the crest of the internal thread and the outside helical surface are centralized under the guiding of the helix until interference contacting; self-locking capability, leak-tightness, loading capability of the tapered external thread and screw hole connecting structure is determined by values of the cone angle ($\alpha$) of the outside helical surfaces; and fastening and connecting functions are realized by sizing of internal and external cones until interference fitting.

2. The tapered external thread and screw hole connecting structure according to claim 1, wherein one end of the main body is an insertion end to be inserted into the connection hole; a small end in each rotation of the helical end surface is orientated towards the insertion end of the main body.

3. The tapered external thread and screw hole connecting structure according to claim 1, wherein one end of the main body is an insertion end to be inserted into the connection hole; a big end in each rotation of the helical end surface is orientated towards the insertion end of the main body.

4. The tapered external thread and screw hole connecting structure according to claim 1, wherein both the outside helical surface and the helical end surface are continuous helical surfaces or non-continuous helical surfaces; and the internal thread is a continuous helical surface or a non-continuous helical surface.

5. The tapered external thread and screw hole connecting structure according to claim 1, wherein the internal thread is a triangular thread, trapezoidal thread, rectangular thread, or an arced thread.

6. The tapered external thread and screw hole connecting structure according to claim 1, wherein when the right trapezoid goes through one rotation, a distance that the right trapezoid axially moves is equal to or greater than a length of the cathetus of the right trapezoid.

7. The tapered external thread and screw hole connecting structure according to claim 1, wherein when the right trapezoid goes through one rotation, a distance that the right trapezoid axially moves is equal to a length of the cathetus of the right trapezoid.

8. The tapered external thread and screw hole connecting structure according to claim 1, wherein a transitional guiding surface is arranged between the outside helical surface and the helical end surface on a same rotation.

9. The tapered external thread and screw hole connecting structure according to claim 1, wherein a head portion with a diameter greater than that of the main body is arranged at an end of the main body; and the connection hole is a connection hole defined on a nut.

* * * * *